United States Patent [19]
Hirota et al.

[11] Patent Number: 5,987,198
[45] Date of Patent: Nov. 16, 1999

[54] OPTICAL BUS AND OPTICAL BUS PRODUCTION METHOD INCLUDING A PLURALITY OF LIGHT TRANSMISSION PATHS

[75] Inventors: Masaki Hirota; Tsutomu Hamada; Takekazu Shiotani; Kazuhiro Sakai; Junji Okada; Masao Funada; Takashi Ozawa, all of Nakai-machi, Japan

[73] Assignee: Fuji Xerox Co., Ltd., Tokyo, Japan

[21] Appl. No.: 08/990,529

[22] Filed: Dec. 15, 1997

[30] Foreign Application Priority Data

Dec. 19, 1996 [JP] Japan .................................... 8-340206

[51] Int. Cl.$^6$ ........................................................ G02B 6/28
[52] U.S. Cl. ................................................................ 385/24
[58] Field of Search ............................. 385/24, 147, 129, 385/130, 46, 89, 131

[56] References Cited

U.S. PATENT DOCUMENTS

| | | | |
|---|---|---|---|
| 4,358,858 | 11/1982 | Tamura et al. | 455/607 |
| 5,195,162 | 3/1993 | Sultan et al. | 385/130 |
| 5,268,973 | 12/1993 | Jenevein | 385/74 |

FOREIGN PATENT DOCUMENTS

| | | |
|---|---|---|
| 4-134415 | 5/1992 | Japan . |
| 6-22351 | 3/1994 | Japan . |
| 6-93051 | 11/1994 | Japan . |

OTHER PUBLICATIONS

*The 9$^{th}$ Science Lecture Meeting of Circuit Packaging Technology,* Teiji Uchida, vol. 15C01, pp. 201–202 (1993).
"Packing Technology for Optical Interconnects" H. Tomimuro et al., IEEE Tokyo No. 33, pp. 81–86 (1994).
*Electronics,* O. Wada, Apr., 1993, pp. 52–55.
"Two dimensional optical buses using planar optics" by S. Kawai, Optronics, No. 6, pp. 100–106 (1992).

Primary Examiner—Akm E. Ullah
Attorney, Agent, or Firm—Oliff & Berridge PLC

[57] ABSTRACT

An optical bus production method for producing an optical bus having an improved transmission efficiency while preventing a data transmission failure. More specifically, the optical bus is produced by preparing first sheets that serve as a light transmission layer, a clad layer is formed on both front and rear sides of each of the first sheets and a second sheet is inserted, is prepared separately from the first sheet and serves as a clearance layer between the first sheets having the clad layer. The resulting optical bus includes a plurality of light transmission paths, each consisting of a light transmission layer and clad layers sandwiching the light transmission layer, and clearance layers for specifying the interval between the light transmission paths, each clearance layer being interposed between adjacent light transmission paths.

6 Claims, 4 Drawing Sheets

OPTICAL BUS AND OPTICAL BUS PRODUCTION METHOD INCLUDING A PLURALITY OF LIGHT TRANSMISSION PATHS

BACKGROUND OF THE INVENTION

1. Field of the Invention

This invention relates to an optical bus for transmitting an optical signal, a method of producing the optical bus, and a signal processor for carrying out signal processing including data transmission and reception using the optical bus.

2. Related Art

The development of very large scale integrated circuits (VLSI) have greatly increased the number of circuit functions of a daughter board used in a data processing system. Since the number of signal connections for each daughter board grows along with an increase in the number of circuit functions, parallel architecture which requires a large number of connectors and connection lines is now employed in a data bus board (mother board) for connecting the daughter boards by a bus structure. The operation speed of a parallel bus is increased by employing the parallel architecture by reducing the width of each connection line and increasing the number of layers for connection lines. However, the processing speed of a system may be limited by the operation speed of the parallel bus due to a signal delay caused by capacity between connection lines or connection line resistance. Electromagnetic interference (EMI) caused by increasing the density of parallel bus connection lines is a great limitation to the improvement of the processing speed of the system.

Use of an intra-system optical connection technology called "optical interconnection" is now under study to solve the above problems and improve the operation speed of a parallel bus. As outlined by Teiji Uchida, the 9th Circuit Packaging Technology Lecture Meeting, 150C011, pp.201 to 202, H. Tomimuro et al., "Packaging Technology for Optical Interconnects", IEEE Tokyo No. 33, pp.81–86, 1994, and Osamu Wada, Electronics Vol. 4, pp.52–55, 1993, there are proposed various optical interconnection technologies according to system configuration.

Out of conventionally proposed optical interconnection technologies, Japanese Published Patent Application No. Hei 6-22351 (discloses the application of an optical data transmission system using high-speed and high-sensitivity light emitting/receiving devices in a data bus. This publication proposes a serial optical data bus for loop transmission between circuit boards in which light emitting/receiving devices are arranged on both front and rear sides of each circuit board and the light emitting/receiving devices on adjacent circuit boards incorporated in a system frame are spatially and optically interconnected. In this system, signal light transmitted from a circuit board is converted into an electric signal by an adjacent circuit board and the electric signal is further converted into an optical signal by the circuit board to be transmitted to the next circuit board. Thus, circuit boards are arranged in series, and opto-electric conversion and electro-optic conversion are carried out on each of the circuit boards so that the signal is transmitted to all the circuit boards incorporated in the system frame. Therefore, the signal transmission speed depends on and is limited by the opto-electric conversion speed and electro-optic conversion speed of the light emitting/receiving devices disposed on each of the circuit boards. Since the optical interconnection of light emitting/receiving devices on the circuit boards with a free space between them is used for data transmission between circuit boards, all the circuit boards must be optically interconnected by carrying out optical alignment of the light emitting/receiving devices on both front and rear sides of adjacent circuit boards. Further, since the circuit boards are interconnected with a free space between them, a data transmission failure may occur due to a crosstalk between adjacent optical data transmission lines. A data transmission failure may also occur due to diffusion of signal light caused by an environment of the system frame, such as dust. Since the circuit boards are arranged in series, when any one of the circuit boards is removed, the interconnection is broken. To compensate for this, an extra circuit board is necessary. That is, a circuit board cannot be removed or added freely and the number of circuit boards is fixed.

A data transmission technology between circuit boards using 2-D array devices is disclosed by Japanese Published Patent Application No. Hei 6-93051. The technology disclosed herein is to optically interconnect circuit boards through an optical path comprising a plate having two parallel surfaces and arranged to face a light source, a diffraction grating and reflection elements, both arranged on the surface of the plate. In this system, light emitted from one point can be transmitted to only one fixed point and all the circuit boards cannot be interconnected unlike an electric bus. Further, the system requires a complex optical system and it is difficult to align optical elements. Therefore, a data transmission failure may occur due to a crosstalk between adjacent optical data transmission paths caused by displacement of the optical elements. Since information on the interconnection of circuit boards is determined by the diffraction grating and reflection elements arranged on the surface of the plate, a circuit board cannot be removed or added with the result that extendability is low.

Another data transmission technology between circuit boards using 2-D array devices is disclosed by Japanese Published Unexamined Patent Application No. Hei 4-134415. This publication discloses a data transmission system comprising a substrate made of a transparent material having a higher refractive index than air, a lens array consisting of a plurality of lenses having a negative curvature and an optical system for causing light emitted from a light source to be incident upon the side surface of the lens array. This publication also discloses a system for forming an area having a low refractive index or a hologram in the substrate in place of the plurality of lenses having a negative curvature. In these systems, light input from the side surface of the substrate is distributed over the top surface of the substrate and output from the plurality of lenses having a negative curvature, the area having a low refractive index or a portion forming the hologram in place of these lenses. Therefore, it is conceivable that the intensity of an emitted signal may vary according to the relationship between the light input position and the light output position of the plurality of lenses, the area having a low refractive index or the portion of the substrate forming the hologram in place of the lenses. The probability of light input from the side surface of the substrate going through a side surface facing the light input surface is considered to be high and the efficiency of light used for signal propagation is low. Further, since optical input elements of the circuit boards must be arranged at the position of the plurality of lenses having a negative curvature, the area having a low refractive index, or the hologram in place of these lenses on the substrate, the freedom of the arrangement of the circuit boards is small and the extendability of the system is low.

It is conceivable to employ an optical bus for diffusing incident light and propagating it as means for solving these problems. However, when the optical bus is formed by laminating together a plurality of light transmission layers for diffusing input light and propagating it so that light is output from an end surface of each light transmission layer as this optical bus and light output from this end surface is received by light receiving elements provided near the end surface, if the thickness of each light transmission layer is small, it is difficult to align the surface of each light transmission layer from which the signal light is output with the light receiving surface of each light receiving element and a data transmission failure occurs. On the other hand, if the thickness of each light transmission layer is made large, the diffusion of signal light output from the light transmission layer is large in the thickness direction of the light transmission layer, thereby reducing the use efficiency of light.

SUMMARY OF THE INVENTION

In view of the above circumstances, it is an object of the present invention to provide an optical bus which has improved transmission efficiency of signal light and prevents a data transmission failure, a method of producing the same, and a signal processor using the same.

The above object can be attained by an optical bus comprising a plurality of light transmission paths, each consisting of a light transmission sheet layer for propagating signal light and clad layers sandwiching the light transmission layer, wherein a clearance layer for specifying the interval between the light transmission paths is interposed between adjacent light transmission paths.

Since the optical bus of the present invention comprises clearance layers for specifying the interval between light transmission paths, each of which is interposed between adjacent light transmission paths, when signal light propagating through each light transmission path is output from the end surface of the light transmission path and received by light receiving elements arranged near the end surface, the thickness of the clearance layer is adjusted to ensure that the interval between light receiving elements for receiving signal light output from the light transmission path should be equal to the interval between light transmission paths, whereby signal light output from the light transmission path is received by the light receiving elements without failure. Therefore, use efficiency of light can be improved and a data transmission failure is prevented.

The clearance layer forming the optical bus of the present invention is preferably made of an elastic material.

When the clearance layer is made of an elastic material, the thickness of the clearance layer can be finely adjusted with ease, thereby making it possible to make the interval between light transmission paths equal to the interval between light receiving elements precisely.

The above object of the present invention can be attained by a method of producing the optical bus of the present invention which comprises a plurality of light transmission paths, each consisting of a light transmission sheet layer for propagating signal light and clad layers sandwiching the light transmission layer, and clearance layers for specifying the interval of the light transmission paths, each of which is interposed between adjacent light transmission paths, the method comprising the steps of:

preparing a plurality of first sheets which serve as the light transmission layer after production and forming the clad layer on both front and rear sides of each of the first sheets, and inserting a second sheet which serves as the clearance layer after production and is prepared separately from the first sheets between the first sheets having the clad layers, thus laminating the first sheets and the second sheets alternately.

The optical bus production method of the present invention comprises preparing the first sheets which serve as the light transmission layer, forming the clad layer on both front and rear sides of each of the first sheets and inserting a second sheet prepared separately from the first sheets and serving as the clearance layer between the first sheets having the clad layers, thus laminating the first sheets and the second sheets alternately. An optical bus, therefore, can be produced in a shorter period of time than a method of producing an optical bus which comprises laminating layers forming the optical bus sequentially.

In the optical bus production method of the present invention, it is effective to form the clad layer by applying a solution of a material forming the clad layer dissolved in a solvent to both front and rear sides of the above light transmission layer.

Thus, when the clad layer is formed by applying a solution of a material forming the clad layer dissolved in a solvent to both front and rear sides of the light transmission layer, it can be formed in a short period of time.

The above object of the present invention can be attained by a signal processor comprising:

(1) a substrate, (2) a plurality of circuit boards, each mounting at least one out of a set of signal light output portions for outputting signal light and electronic circuits for generating signals to be carried by the signal light output from the signal light output portions and a set of signal input portions for inputting signal light and electronic circuits for carrying out signal processing based on the signals carried by the signal light input from the signal light input portions, (3) an optical bus comprising a plurality of light transmission paths, each consisting of a light transmission sheet layer for propagating signal light and clad layers sandwiching the light transmission layer, and clearance layers for specifying the interval between the light transmission paths, each of which is interposed between adjacent light transmission paths; and (4) a plurality of substrate fixing portions for fixing the circuit boards on the substrate in such a manner that the signal light output portions or the signal light input portions mounted on each of the circuit board are optically connected to the optical bus.

According to the signal processor of the present invention, as the optical bus of the present invention is employed, high-speed communication of optical signals is realized and a data transmission failure is prevented.

Further, in the signal processor of the present invention, the signal light output portions or the signal light input portions mounted on the circuit board are optically connected to the optical bus at the same time when the circuit board is fixed on the substrate fixing portion, thereby eliminating the need for delicate alignment.

The above and other objectives, features and advantages of the present invention will become more apparent from the following description when taken in conjunction with the accompanying drawings.

DETAILED DESCRIPTION OF THE PREFERRED EMBODIMENTS

Preferred embodiments of the present invention are described hereinbelow.

Figure 1:
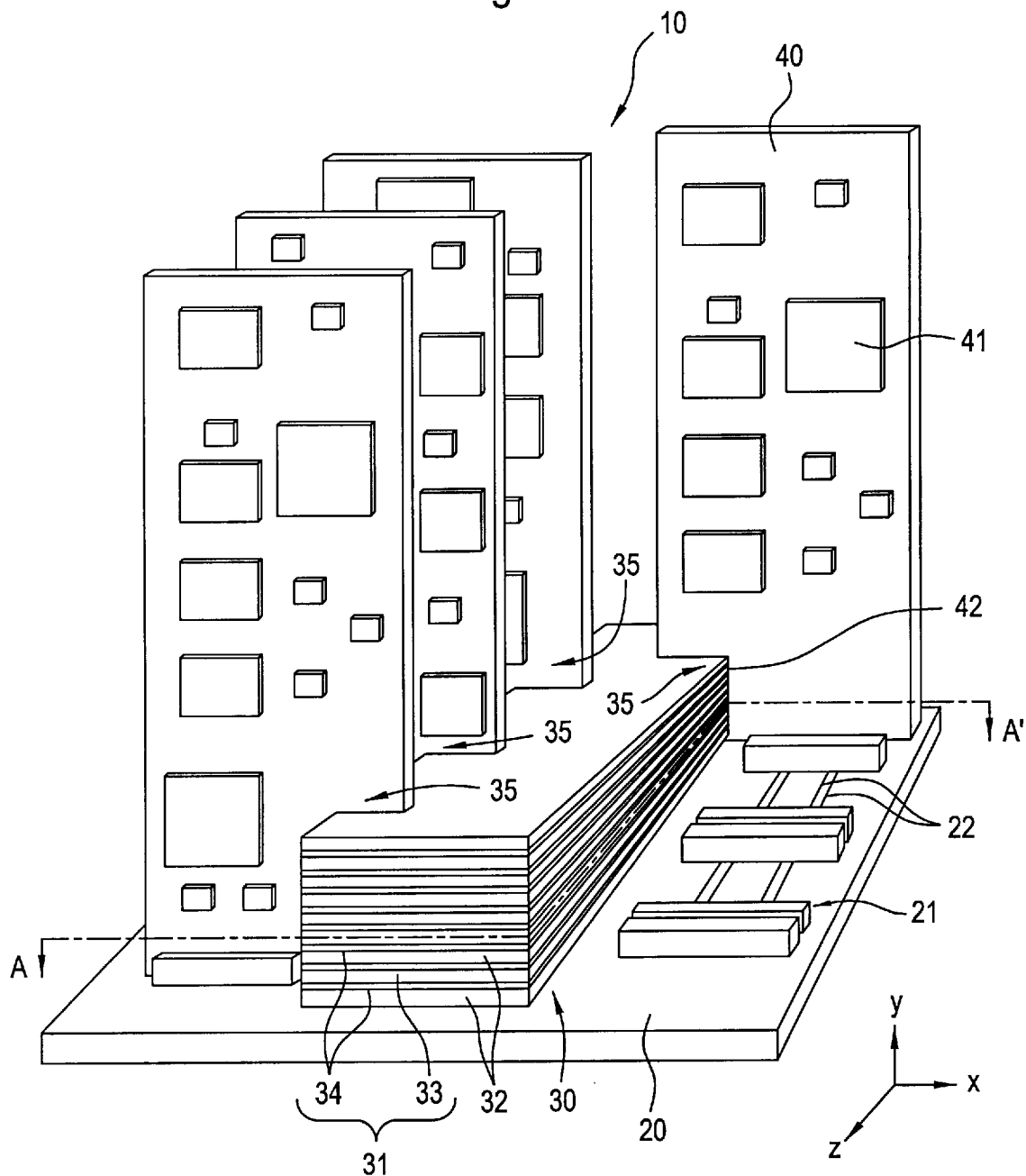
FIG. 1 is a schematic diagram of a signal processor according to an embodiment of the present invention which comprises a sheet optical data bus according to an embodiment of the optical bus of the present invention and a plurality of circuit boards optically interconnected by the sheet optical data bus.
Figure 2:
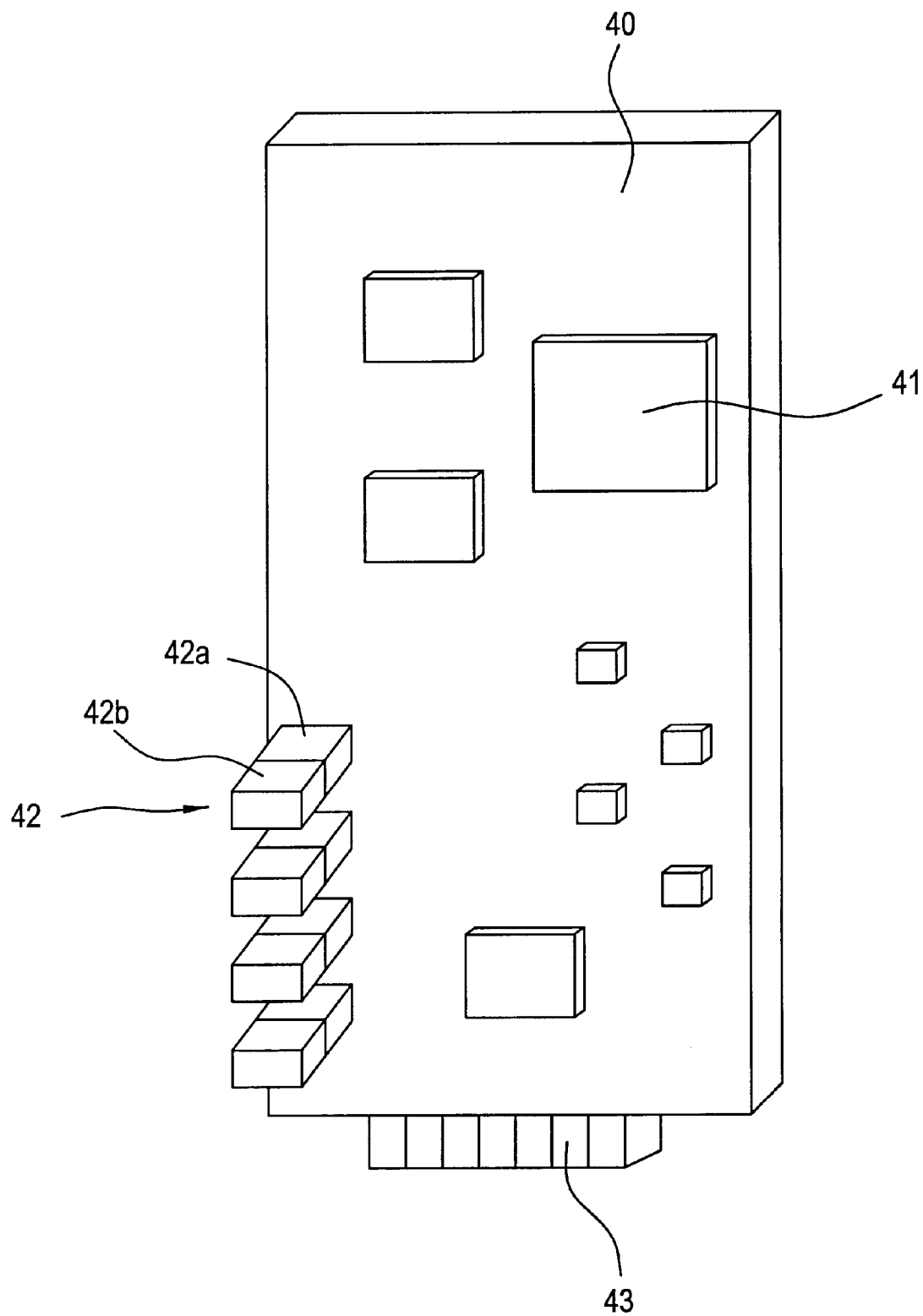
FIG. 2 is a diagram showing a circuit board mounting light emitting/receiving elements and electronic circuits forming the signal processor shown in FIG. 1.

FIG. 1 is a schematic diagram of a sheet optical data bus according to an embodiment of the optical bus of the present invention and a signal processor according to an embodiment of the present invention which has a plurality of circuit boards optically interconnected by the sheet optical data bus. FIG. 2 is a diagram showing the circuit board forming the signal processor shown in FIG. 1 and mounting light emitting/receiving elements and electronic circuits.

A sheet optical data bus 30 according to an embodiment of the optical bus of the present invention is fixed on a base substrate 20 forming the signal processor 10 shown in FIG. 1. Substrate connectors 21, . . . , 21 are fixed on this base substrate 20, and circuit boards 40, . . . , 40 mounting electronic circuits 41 are detachably installed on the respective connectors 21, . . . , 21.

Power lines and electric wires 22 for transmitting electric signals are provided on the base substrate 20, and the electric wires 22 are electrically connected to the electronic circuits 41 mounted on the circuit boards 40, . . . , 40 installed on the substrate connectors 21, 21.

Each of the circuit boards 40, . . . , 40 has four light emitting/receiving elements 42, each consisting of a pair of laser diodes 42a and photodiodes 42b as shown in FIG. 2. The light emitting/receiving elements 42 are arranged in a side end portion of the circuit board 40 so that they are situated at the same interval in the thickness direction of the sheet optical data bus 30 when the circuit board 40 is installed on the substrate connector 21. The laser diode 42a emits red visible light having a wavelength of 650 nm and the photodiode 42b is sensitive to the red visible light having a wavelength of 650 nm. Electric signal input/output terminals 43 are provided on a lower end portion of the circuit board 40.

When the circuit board 40 is installed on the substrate connector 21, the light emitting/receiving elements 42, . . . , 42 are arranged to face the signal light input/ output portion 35 of the sheet optical data bus 30 so that they are optically connected to the sheet optical data bus 30.

The structure of the sheet optical bus 30 according to an embodiment of the optical bus of the present invention and forming the signal processor 10 and the production method thereof are described hereinbelow with reference to FIGS. 3 and 4.

Figure 3:
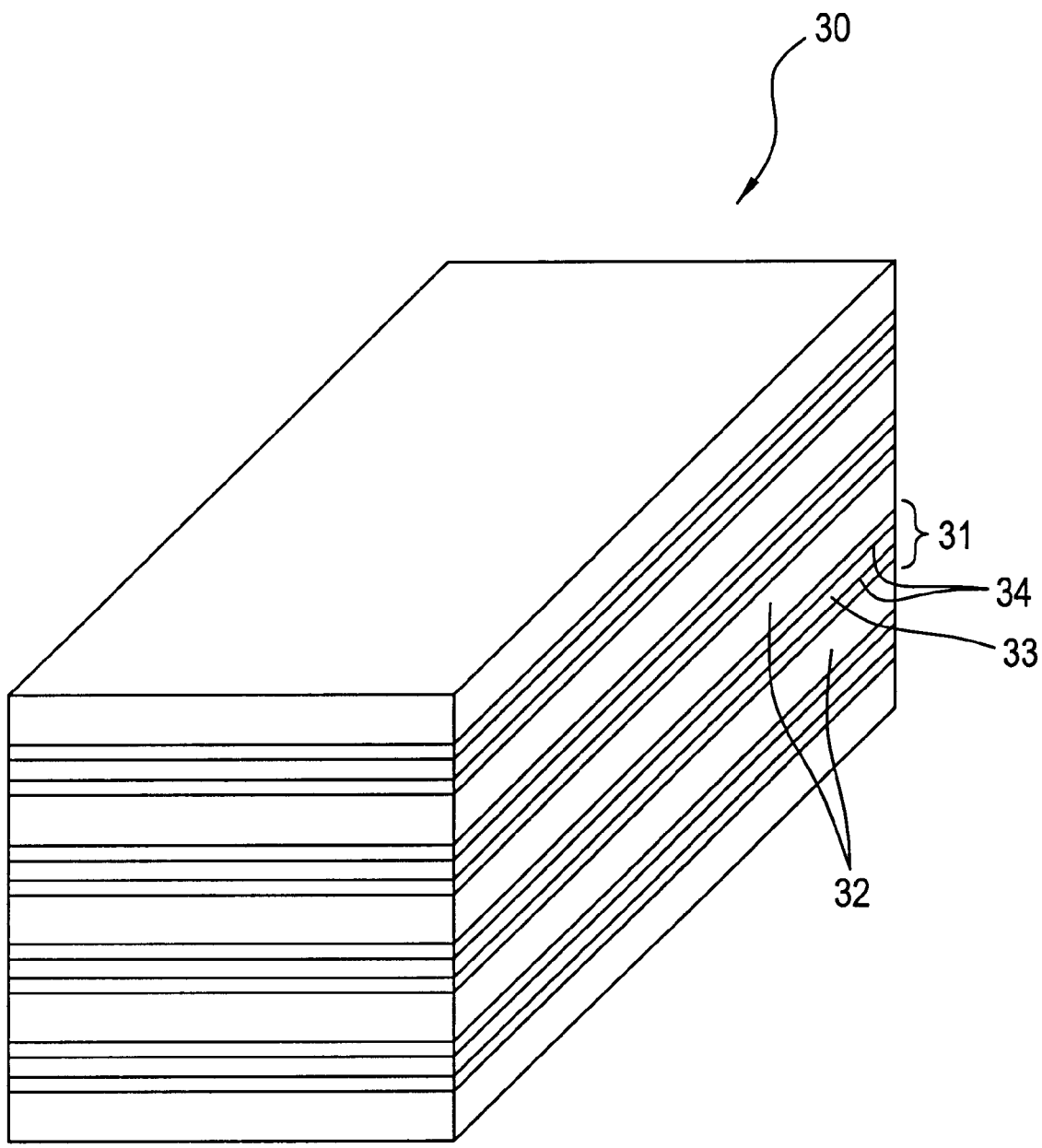
FIG. 3 is a perspective view of the sheet optical data bus shown in FIG. 1.
Figure 4:
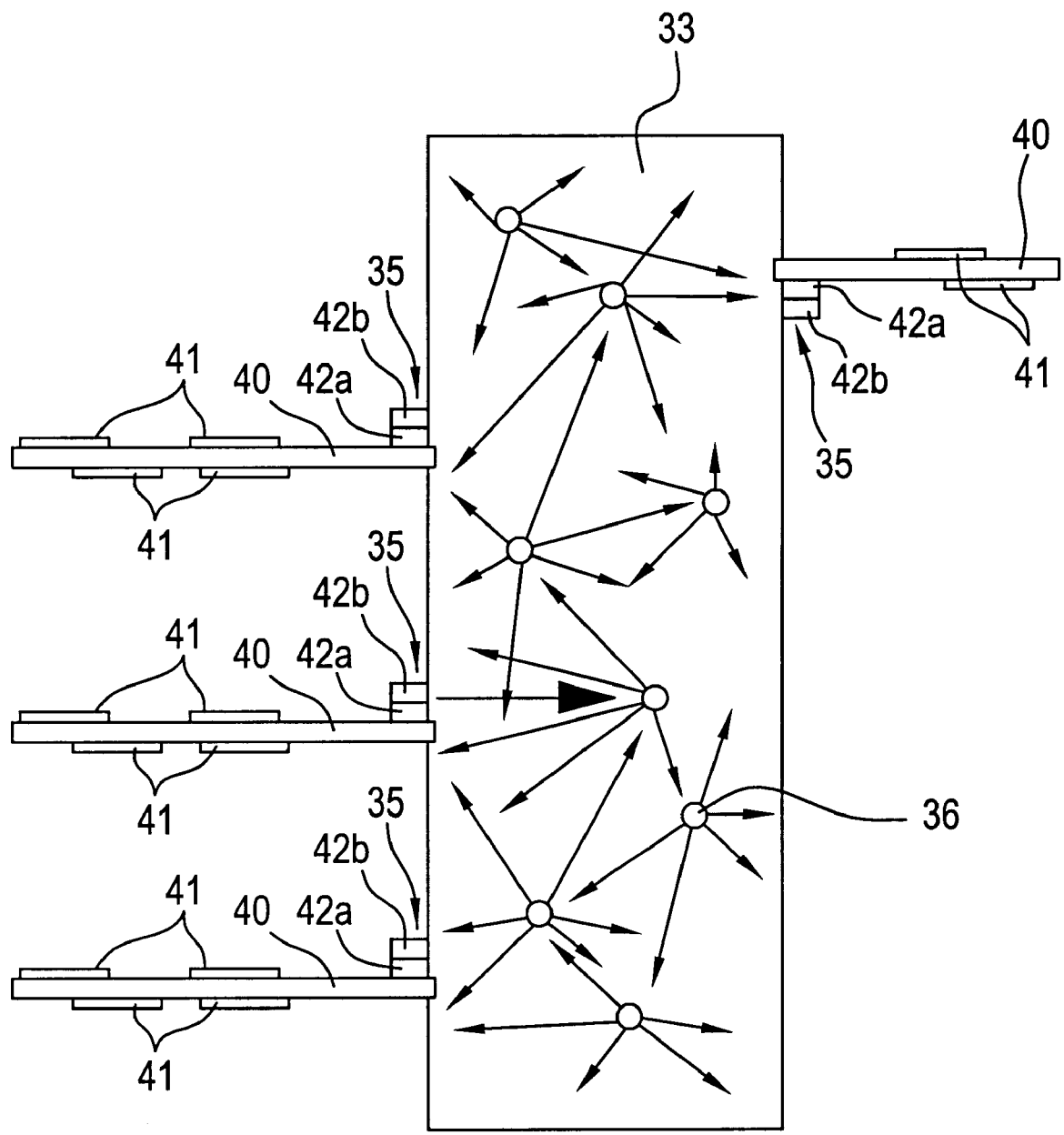
FIG. 4 is a sectional view of FIG. 1 seen from a direction A-A'.

FIG. 3 is a perspective view of the sheet optical data bus shown in FIG. 1, and FIG. 4 is a sectional view of the sheet optical data bus seen from a direction A-A' of FIG. 1.

As shown in FIG. 3, the sheet optical data bus 30 has a laminate structure consisting of light transmission paths 31 and clearance layers 32 which are laminated alternately. The light transmission path 31 is used to propagate signal light and the clearance layer 32 is used to specify the interval between the transmission paths 31. The light transmission path 31 consists of a light transmission layer 33 and clad layers 34 sandwiching this light transmission layer 33, an end surface of the light transmission layer has signal light input/output portions 35 for inputting and outputting signal light as shown in FIG. 4, and light diffusers 36 for diffusing signal light input from the signal input/output portions 35 are contained sporadically in the light transmission layer 33.

Preferably, this light transmission layer 33 has high light transmittance because signal light is propagated through it. In this embodiment, polymethyl methacrylate (PMMA) having a thickness of 0.5 mm per layer is used in the light transmission layer 33 and polystyrene (PS) having a light refractive index different from that of PMMA is used as the light diffuser 36 contained sporadically in the light transmission layer 33.

The clad layer 34 serves to prevent light going through the light transmission layer 33 from leaking in the thickness direction of the layer, and a material having a lower light refractive index than that of the light transmission layer 33 is used. In this embodiment, a fluororesin material is used.

The clearance layer 32 is used to specify the interval between adjacent light transmission paths 31, and an elastic heat curing silicone rubber material having a thickness of 4.48 mm per layer is used in this embodiment.

The above sheet optical data bus 30 is produced by an optical bus production method according to an embodiment of the present invention which is described hereinbelow.

A plurality of 0.5 mm-thick sheets serving as the light transmission layer 33 are prepared. The sheet is made of polymethyl methacrylate (PMMA) which is cured and contains the light diffusers 33 made of polystyrene (PS) sporadically. The PMMA sheet is cured to facilitate the formation of a clad layer on both front and rear sides of the PMMA sheet which is carried out thereafter.

Subsequently, the cured PMMA sheet is kept horizontally and 20 cc of a solution of an amorphous fluororesin dissolved in a perfluoro solvent having a viscosity of 1,300 cps is dropped onto one side of the PMMA sheet.

Thereafter, the PMMA sheet is rotated at 500 rpm for 10 seconds around a shaft intersecting at a right angle the surface onto which the solution is dropped to form a coating film having a thickness of 5 $\mu$m and baked at 50° C. for 30 minutes and further at 120° C. for 10 minutes.

Thereafter, 20 cc of the above solution is dropped onto the surface on which the 5 $\mu$m-thick coating film is formed of the PMMA sheet again.

Then, the PMMA sheet is rotated at 500 rpm for 10 seconds to form a coating film having a thickness of 5 $\mu$m and baked at 50° C. for 30 minutes and further at 120° C. for 180 minutes. Thus, a 10 $\mu$m-thick clad layer is formed on one side of PMMA. The above procedure is repeated to form a 10 $\mu$m-thick clad layer on the other side of PMMA.

Thereafter, 4.48 mm-thick heat curing silicone rubber sheets which serve as a clearance layer and are prepared separately from the PMMA sheets and the PMMA sheets having the clad layers formed thereon are laminated alternately, and the laminated sheets are contact bonded together such that the interval between the PMMA sheets becomes equal to the interval between the light emitting/receiving elements 42 on the circuit board 40.

Thus, the sheet optical data bus 30 shown in FIG. 3 is produced.

How to install the circuit board 40 shown in FIGS. 1, 2, and 4 on the substrate connector 21 is described with reference to FIGS. 1 and 2.

The electric signal input/output terminals 43 of the circuit board 40 are connected to the substrate connector 21 on the base substrate 20 shown in FIG. 1, thereby specifying two directions y and z shown in FIG. 1. The light emitting/receiving elements 42 on the circuit board 40 are placed against the sheet optical data bus 30, whereby a direction x shown in FIG. 1 is specified and the light emitting/receiving elements 42 are optically connected to the optical data bus 30 at the same time.

In this embodiment, simply by installing the circuit board 40 on the substrate connector 21 properly, its electrical connection with the electric wire 22 on the base substrate 20 and its optical connection with the sheet optical data bus 30 are completed.

Thus, the signal processor 10 shown in FIG. 1 is constructed.

How light input into the sheet optical data bus 30 constituting the signal processor 10 is output is described hereinbelow with reference to FIG. 4.

When pulse light carrying a signal is output from the laser diode 42a of the light emitting/receiving element 42 on the circuit board 40, it is input into the light transmission layer 33 of the sheet optical data bus 30. This input light propagates through the light transmission layer 33, is scattered repeatedly by the light diffusers 36 contained sporadically in the light transmission layer 33, diffused into the entire light transmission layer 33 and detected by the photodiodes 42b at the side end portions of the circuit boards 40, . . . , 40 arranged on the end surface of the light transmission layer 33. Thus, light emitted from the laser diode 42a provided on one circuit board 40 is propagated to the photodiodes 42b of the circuit boards 40, . . . , 40.

Signal light indicative of an address and signal light indicative of data are input into the same light transmission layer 33 from the laser diode 42a sequentially. A data receiver is specified by the first address signal light so that only the specified circuit board 40 receives the data signal light. The transmission and reception of the signal light is carried out simultaneously in each of the optical transmission paths 31. The transmission and receiving timings of signal light through each light transmission path 31 are synchronized with clock signal light given to one layer out of the plurality of light transmission paths 31, whereby signal light transmitted and received through each light transmission path 31 is uniformly specified as a parallel signal. In this embodiment, the width of the data bus is 4 bits and each layer of the light transmission path 31 is equivalent to 1 bit. Therefore, the indication of an address and the transmission and reception of data are carried out through four layers of the light transmission paths 31. When the width of the bus is increased to 8 bits, for example, the number of the layers of the light transmission paths 31 should be eight. One of the layers of the light transmission paths 31 can be made equal to 2 bits, or two or more layers of the light transmission paths 31 can be made equal to 1 bit.

Since the above structured signal processor 10 employs the sheet optical data bus 30 having clearance layers 32 for specifying the interval between the light transmission paths 31, each of which is interposed between adjacent light transmission paths 31, the interval between the light transmission layers 33 is adjusted to be equal to the interval between the light emitting/receiving elements 42 arranged on the side end portion of the circuit board 40. Therefore, use efficiency of light can be improved and a data transmission failure is prevented.

While the clearance layer 32 is made of an elastic material in the above embodiment, it may be made of a rigid material if it specifies the interval between the light transmission paths.

While the light transmission layer 33 is made of polymethyl methacrylate (PMMA) in the above embodiment, it may be made of a plastic material having the same optical characteristics such as polystyrene (PS) or polycarbonate (PC). When the light transmission layer 33 is made of polystyrene (PS) or polycarbonate (PC), the clad layer 32 can be formed by applying a solution of an amorphous fluororesin material dissolved in a perfluoro solvent. While the clad layer is formed by applying a solution of an amorphous fluororesin material dissolved in a perfluoro solvent in the above embodiment, an amorphous fluorine rubber material or crystalline fluorine polymer material may be used in place of the amorphous fluororesin material. When the material of the light diffusers 36 contained sporadically in the light transmission layer 33 to provide a light diffusion function is a plastic material having a light refractive index different from that of a light transmission portion of the light transmission layer 33, the same function can be obtained.

In the above embodiment, the light transmission layers 33, the clad layers 34, and the clearance layers 32 are made as thick as 0.5 mm, 10 $\mu$m, and 4.48 mm, respectively. However, if their optical characteristics are not impaired, the thicknesses of these layers may be larger or smaller than these values. When each layer is made thin, an optical data bus having an extremely large bus width can be constructed with a small space, thereby making it possible to greatly improve data transmission rate.

In the above embodiment, the clad layer is formed by spin coating by rotating the PMMA sheet. However, it may be formed by roll coating.

Further, in the above embodiment, to provide a diffusion function to the light transmission layer 33, polystyrene (PS) is contained sporadically in the polymethyl methacrylate (PMMA). However, a scattering optical element such as an optical diffusion lens may be provided in the input portion of the laser diode 42a or an optical diffuser for reflecting and diffusing light may be provided at a position where a light beam from the laser diode 42a goes straight through the light transmission layer 33 and reaches the opposite side of the light transmission layer 33 in place of the light diffusers 36 contained sporadically in the light transmission layer 33.

As described above, according to the present invention, an optical bus which has improved transmission efficiency of signal light and prevents a data transmission failure, a method of producing the same, and a signal processor using the same are obtained.

Further, according to the present invention, since output signal light from a circuit board is transmitted to all other circuit boards through the optical bus at the same time, signal transmission among the circuit boards is completed by carrying out opto-electric conversion and electric-opto conversion just once. Further, according to the present invention, a circuit board can be freely removed or added for extension of a system. In this case, a special short-circuit connector is not needed in an empty slot, and an extendable system can be constructed.

What is claimed is:

1. An optical bus comprising a plurality of light transmission paths, each consisting of a light transmission sheet layer for propagating signal light, and clad layers sandwiching said light transmission layer, said optical bus further comprising:
    a clearance layer interposed between adjacent light transmission paths, said clearance layer formed from a material having a non-zero thickness that maintains a specified interval between the transmission sheet layers of adjacent light transmission paths.

2. The optical bus of claim 1, wherein said clearance layer is made of an elastic material.

3. The optical bus of claim 1, further comprising means for diffusing said signal light.

4. A method of producing an optical bus which comprises a plurality of light transmission paths, each consisting of a light transmission sheet layer for propagating signal light and clad layers sandwiching said light transmission layer, and clearance layers for specifying the interval of the light transmission paths, each of which is interposed between adjacent light transmission paths, said method further comprising the steps of:

preparing a plurality of first sheets which serve as said light transmission layer after production and forming the clad layer on both front and rear sides of each of the first sheets, and inserting a second sheet which serves as said clearance layer after production and is prepared separately from said first sheets between said first sheets having said clad layers, thus laminating said first sheets and said second sheets alternately.

5. The optical bus production method of claim 4, wherein said clad layer is formed by applying a solution of a material forming said clad layer dissolved in a solvent to both front and rear sides of said light transmission layer.

6. A signal processor comprising:

a substrate, a plurality of circuit boards, each being equipped with at least any one of a set of a signal light output portion for outputting signal light and an electronic circuit for generating signals to be carried by the signal light output from the signal light output portions; and a set of a signal input portion for inputting signal light and an electronic circuit for carrying out signal processing based on the signals carried by the signal light input from the signal light input portion, an optical bus comprising a plurality of light transmission paths, each consisting of a light transmission sheet layer for propagating signal light and clad layers sandwiching said light transmission layer, and clearance layers for specifying the interval between the light transmission paths, each being interposed between adjacent light transmission paths; and a plurality of substrate fixing portions for fixing said circuit boards on said substrate in such a manner that the signal light output portions or the signal light input portions mounted on each of said circuit board are optically connected to the optical bus.

* * * * *